(12) United States Patent
Ronen et al.

(10) Patent No.: US 9,398,034 B2
(45) Date of Patent: Jul. 19, 2016

(54) MATRIX FACTORIZATION FOR AUTOMATED MALWARE DETECTION

(71) Applicant: Microsoft Technology Licensing, LLC, Redmond, WA (US)

(72) Inventors: Royi Ronen, Tel Aviv (IL); Shay Kels, Givatayim (IL); Elad Ziklik, Modi'in (IL); Efim Hudis, Bellevue, WA (US); Corina Feuerstein, Herzilya (IL); Tomer Brand, Hod Hasharon (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/135,247

(22) Filed: Dec. 19, 2013

(65) Prior Publication Data

US 2015/0180890 A1 Jun. 25, 2015

(51) Int. Cl.
- *G06F 21/00* (2013.01)
- *H04L 29/06* (2006.01)
- *G06F 21/56* (2013.01)

(52) U.S. Cl.
CPC ............ *H04L 63/1416* (2013.01); *G06F 21/56* (2013.01)

(58) Field of Classification Search
CPC .............................. G06F 21/566; G06F 21/56
See application file for complete search history.

(56) References Cited

U.S. PATENT DOCUMENTS

| | | | |
|---|---|---|---|
| 7,904,573 B1 | 3/2011 | Nachenberg et al. | |
| 7,917,393 B2* | 3/2011 | Valdes et al. | 726/23 |
| 7,962,937 B2* | 6/2011 | Cho et al. | 725/44 |
| 8,413,244 B1* | 4/2013 | Nachenberg | H04L 63/145 713/188 |
| 8,479,276 B1* | 7/2013 | Vaystikh et al. | 726/13 |
| 8,516,584 B2* | 8/2013 | Moskovitch et al. | 726/23 |
| 2005/0283837 A1* | 12/2005 | Olivier | H04L 63/145 726/24 |
| 2010/0257129 A1* | 10/2010 | Lyon et al. | 706/12 |
| 2011/0219450 A1* | 9/2011 | McDougal et al. | 726/23 |
| 2012/0084859 A1* | 4/2012 | Radinsky et al. | 726/23 |
| 2012/0311708 A1* | 12/2012 | Agarwal | G06F 21/55 726/24 |
| 2013/0097706 A1* | 4/2013 | Titonis et al. | 726/24 |
| 2013/0145466 A1* | 6/2013 | Richard | G06F 21/562 726/23 |
| 2013/0326625 A1* | 12/2013 | Anderson et al. | 726/23 |

FOREIGN PATENT DOCUMENTS

| | | |
|---|---|---|
| CN | 103023927 A | 4/2013 |
| WO | 2013113532 A1 | 8/2013 |

OTHER PUBLICATIONS

Ye, et al., "Automatic Malware Categorization Using Cluster Ensemble", In Proceeding of the 16th ACM International Conference on Knowledge Discovery and Data Mining, Jul. 25, 2010, 10 pages.

(Continued)

*Primary Examiner* — Morshed Mehedi
(74) *Attorney, Agent, or Firm* — Timothy Chuma; Judy Yee; Micky Minhas

(57) ABSTRACT

Disclosed herein is a system and method for automatically identifying potential malware files or benign files in files that are not known to be malware. Vector distances for select features of the files are compared to vectors both known malware files and benign files. Based on the distance measures a malware score is obtained for the unknown file. If the malware score exceeds a threshold a researcher may be notified of the potential malware, or the file may be automatically classified as malware if the score is significantly high.

17 Claims, 4 Drawing Sheets

(56) References Cited

OTHER PUBLICATIONS

Krueger, et al., "ASAP: Automatic Semantics-Aware Analysis of Network Payloads", In Proceedings of the International Conference on Privacy and Security Issues in Data Mining and Machine Learning, Sep. 24, 2010, 14 pages.

Ye, et al., "Intelligent File Scoring System for Malware Detection from the Gray List", In Proceeding of the15th ACM International Conference on Knowledge Discovery and Data Mining, Jun. 28, 2009, 9 pages.

Bateni, et al., "Using Artificial Immune System and Fuzzy Logic for Alert Correlation", In Proceeding of the International Journal of Network Security, vol. 15, Issue 1, Jan. 2013, 15 pages.

Tahan, et al., "Mal-ID: Automatic Malware Detection Using Common Segment Analysis and Meta-Features", In Journal of Machine Learning Research, vol. 13, Issue 1, Jan. 2012, 31 pages.

Ye, et al., "Combining File Content and File Relations for Cloud Based Malware Detection", In Proceedings of the 17th ACM SIGKDD Conference on Knowledge Discovery and Data Mining, Aug. 21, 2011, 9 Pages.

Karampatziakis, et al., "Using File Relationship in Malware Classification", In Proceedings of Conference on Detection of Intrusions and Malware & Vulnerability Assessment, Jul. 26, 2012, 23 pages.

Chau, et al., "Polonium: Tera-Scale Graph Mining and Inference for Malware Detection", In Proceedings of 2nd Workshop on Large-scale Data Mining: Theory and Applications, Jul. 25, 2010, 8 pages.

"Second Written Opinion Issued in PCT Patent Application No. PCT/US2014/070690", Mailed Date: Nov. 24, 2015, 5 Pages.

"International Search Report and Written Opinion Issued in PCT Patent Application No. PCT/US2014/070690", Mailed Date: Feb. 19, 2015, 11 Pages.

Ponomarev, et al., "Evaluation of Random Projection for Malware Classification", In Proceedings of IEEE 7th International Conference on Software Security and Reliability Companion, Jun. 18, 2013, pp. 68-73.

International Preliminary Report on Patentability Issued in PCT Application No. PCT/US2014/070690, Mailed Date: Feb. 29, 2016, 8 Pages.

* cited by examiner

MATRIX FACTORIZATION FOR AUTOMATED MALWARE DETECTION

TECHNICAL FIELD

This description relates generally to automatically identifying potential malware files and infected machines based on comparisons to features of known malware through the use of matrix factorization.

BACKGROUND

Malware detection and identification is a complex process that requires a substantial amount of human involvement. Developers of malware are always trying to outsmart the malware detection and removal companies by constantly adapting and modifying the shape and behavior of the malware. As malware detection relies on signatures malware developers are able to stay one step ahead of the detection companies through this constant changing and adapting of their malware files requiring the malware detection companies to constantly adapt the signatures to detect the changed malware.

Current malware detection relies on companies and individuals to submit samples of malware or suspected malware after an infection or attack has occurred. A malware researcher will analyze the file and develop a signature for that file. This signature will then be pushed out to the detection programs so that the file will be identified in the future as malware. The malware researcher spends a large amount of time trying to determine if a particular file is in fact malware or is a benign file.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a system and method for determining whether an unknown file is malware or benign file or if a computing system has been infected by malware or is soon to be infected with malware. The present disclosure uses cloud and distributed computing to receive from multiple machines information about a large number of files. Some of these files may be malware while some of the files may not. By aggregating the information about the large number of files the system is able to determine characteristics about the files that may make a file malware or not. The system generates a matrix of all of the machines and the associated files on the machines. As there are many machines in the system the same file will likely appear on multiple machines. Each file and machine has a set of corresponding features that identify the characteristics of the files and machines. The present disclosure identifies a subset of the features that are most determinative in identifying a specific file from the noise generated from all of the features. These features are then used to generate vectors for all of the files. The same features are used against known malware to generate vectors for the known malware. For each file a group of files both malware and not that are similar to the file are identified. Then a distance measure is calculated between the file and at least the malware files in the group of files. This distance measure is used to generate a malware score for the file. This malware score is compared against a threshold score. If the file exceeds the threshold score the file is identified as potential malware, if the score exceeds a higher threshold it may automatically labeled as malware without the need for the malware researcher to review the file. The same process for files can be applied to machines to detect infected machines or to websites and URL to detect malicious sites.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
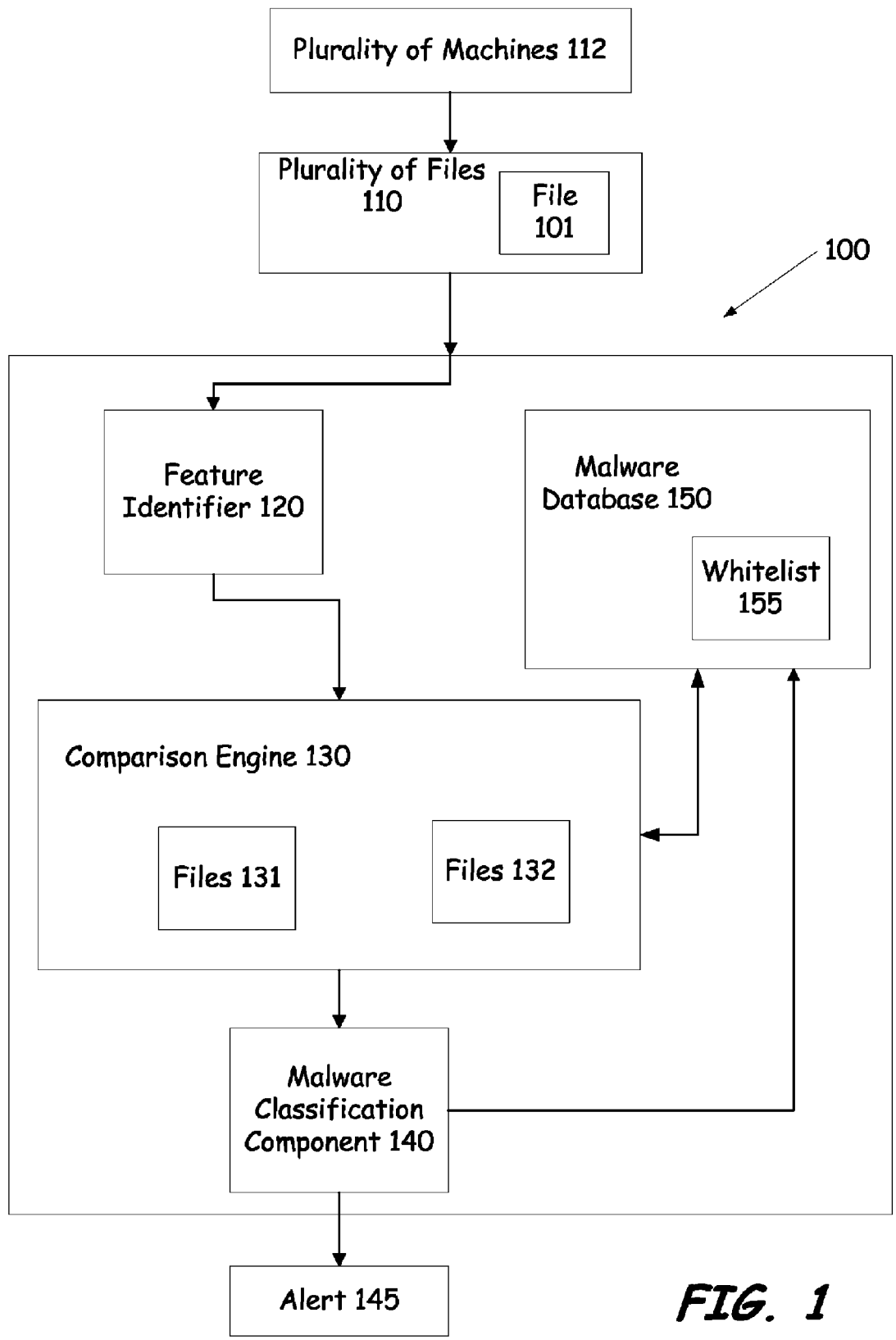
FIG. 1 is as block diagram illustrating components of a malware detection system according to one illustrative embodiment.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. This is distinct from computer storage media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

The identification of malware has been a constant game of cat and mouse between developers of malware or malware authors who desire to inflict their malicious code on computer systems and the analysts who try to block the malware from taking hold and inflicting the damage on users and computer systems. Malware developers constantly change or modify their tactics in creating the malware to make it more difficult for anti-malware programs to identify, isolate and remove malware. Typically malware is identified when users submit samples of malware to a malware researcher after their system has become infected by the malware component. The researcher investigates a submitted malware sample and determines if the sample is in fact malware and not something else and if it is malware then the researcher identifies a signature for the malware. This malware signature is then published so that anti-malware programs can make use of the signature to identify a file as malware when presented to a system hosting the anti-malware program.

However this approach to identifying malware is extremely labor intensive as the researcher must evaluate each submitted malware candidate to determine if the candidate is in fact malware. Worldwide there are very few malware researchers actively handling malware samples. Often these malware researchers are all looking at the same or similar malware candidates. This reduces the number of unique malware candidates that can be looked at on a daily basis. Current estimates indicate that there are over 200,000 new malware samples produced each day and approximately 500,000 files reported as suspect files. The sheer numbers of suspect files and the number malware samples generated daily and the time it takes to manually analyze the suspect files and generate an associated signature for actual malware makes it more likely that a malware sample may run in the wild for a number of days before a signature is found and published.

The present disclosure presents a system and method for automatically identifying malware samples that are to be presented to a researcher for consideration as malware, while simultaneously removing from consideration those files that would have been reported as malware, but can be automatically determined to not be malware. Further, the present disclosure permits the automatic identification of unknown malware without the need for researcher involvement. Additionally the present disclosure may identify additional machines that are either under a malware attack or likely to soon have a malware attack based on comparisons with other machines.

FIG. 1 is as block diagram illustrating components of a malware detection system according to one illustrative embodiment. Malware detection system 100 includes a plurality of files 110, a feature identifier 120, a comparison engine 130, a malware classification component 140 and a malware database 150. Malware detection system 100 may determine a file is malware or potential malware, may determine that a machine is currently experiencing a malware attack, or may determine that a particular universal resource locator (URL) or website is a source or providing malicious files. While the present discussion focuses on the detection of a malware file the ideas and concepts presented herein are applicable to detecting a malware attack on a machine by considering the properties of the files on the machine as against the malware database 150. Further, the concepts presented herein are applicable to the comparison of a URL with the payloads/files that re downloaded from the sites by considering the properties of the payloads/files with the malware database 150. This can be used to identify malicious or compromised URLs. In these alternative embodiments the specific file, machine, URL etc. may be substituted, accordingly, but the concepts remain the same.

Malware system 100 receives a plurality of files 110 that will be scored for potential malware candidates. In some embodiments the plurality of files may be information about the files such as telemetry of the files. The plurality of files 110 may be received from a single computer or may be received from a plurality of computing devices or machines 112. Generally, the more computing devices that provide the plurality of files 110 to the malware system the better the results of the malware detection system will be. The plurality of files 110 may include files such as documents, spreadsheets, audio, video, configuration files, registry files, operating system files or any other component or subcomponent of a computing system that may be susceptible to having a malware infestation. In some embodiments the plurality of files 110 includes all of the files from each computer that provides files to the malware detection system. In other embodiments the plurality of files 110 are files that were determined by the associated computer, such as through its malware detection program, to be suspicious files. A file in this case may be considered suspicious because it has characteristics of malware or may be of a type that the computer does not recognize as a safe file.

Figure 2:
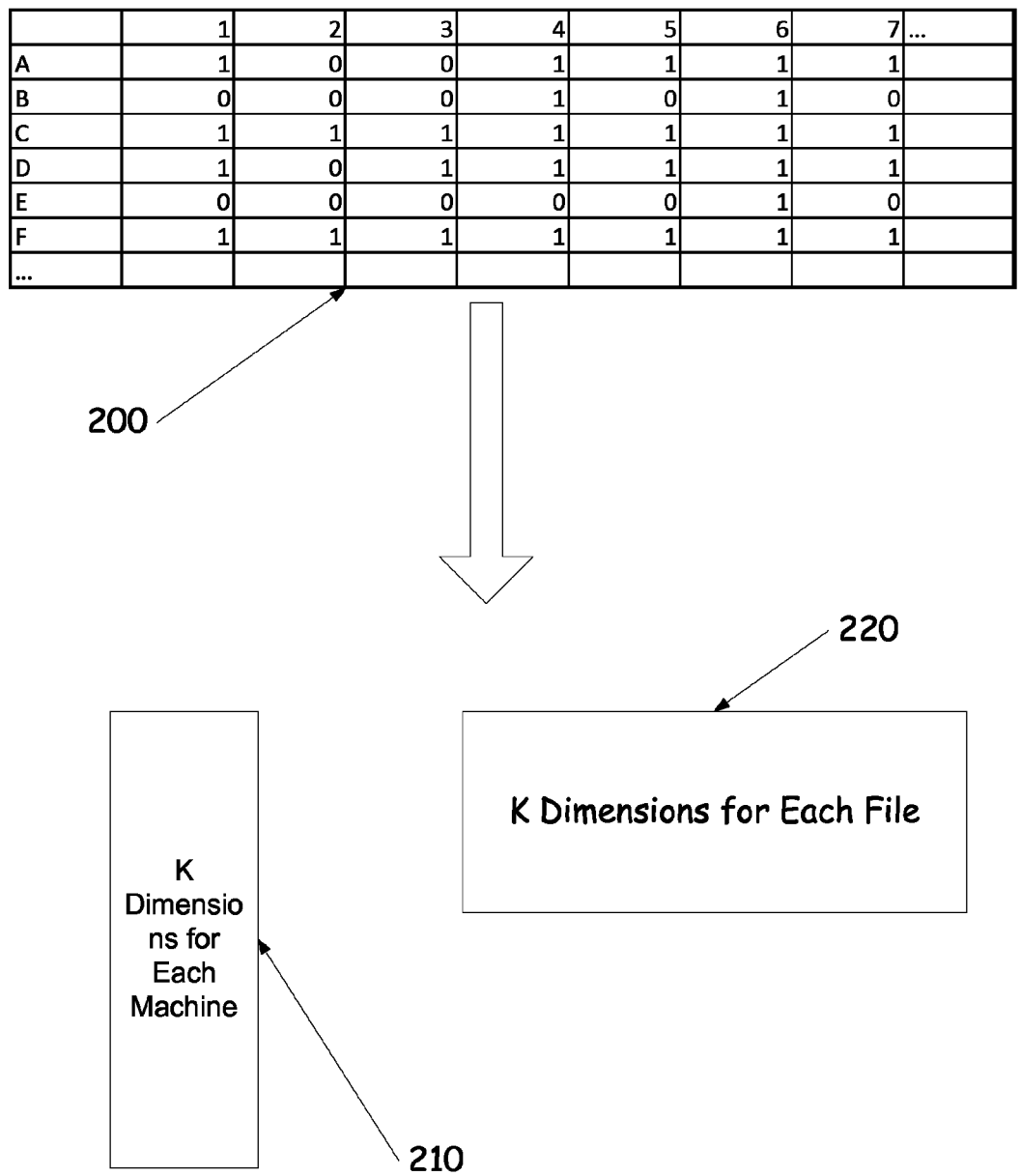
FIG. 2 is a block diagram illustrating a matrix and factorized matrices according to one illustrative embodiment.

Feature identifier 120 is a component of the malware detection system 100 that is configured to generate at least one feature vector for each file, such as file 101, in the plurality of files 110. The feature identifier 120 considers each file that is presented to the malware detection system 100 as well as the machine that provided the file to the detection system 100. The feature identifier 120 takes each file and each machine and generates a matrix set for each file and each machine. An example matrix is illustrated in FIG. 2. The feature identifier 120 is configured to factorize the matrix 200 into two different matrices, machine matrix 210 and file matrix 220, of k dimensions. Where the k dimensions represent features of the file or machine. Through this approach the feature identifier 120 generates two different types of vectors, a vector from a machine perspective and a vector from a file perspective. In some embodiments the binaries for the files or machines may be weighted.

For a file the feature identifier 120 builds a vector for the file where the particular file is associated with each machine. Thus, for a file the vector is built by considering which of the machines reports out the particular file as being present on that machine. As such the file is described by a vector of length M where the elements of M are binary elements representing one machine such that if the file is on that machine the binary is 1 and if the file is not found the machine the binary is 0. Each file has a number of features associated with the file. These features can include properties such as behavior, size, date it appeared on a machine, similarity to other files, etc. These features can also include proximity to other files, or how often a group of files is seen with each other. However, these features generally have an abstract meaning that represents the behavior of the file. In building the vector for a file the feature identifier 120 identifies a number of features that are considered the most informative features of the file based on the data currently available. Over time the features used by the feature identifier 120 can change as different features may become more informative. These features become the K dimensions of the matrix for the file.

For each machine the feature identifier 120 builds a vector for that machine by associating each file that is present on the machine with the machine. The vector for the machine is built by considering which of the files, out of all of the files reported by all machines, are present on that machine. As such the machine is described by a vector of length F where the elements of F are binary elements representing each file such that if the machine has that file the binary is 1 and if the machine does not have the file then the binary is 0. Again the vector for each machine has and is represented by the K dimensions of features that were associated with the files.

In determining which features of the files and machines that will be used for the K dimensions of features, the feature identifier 120 performs dimensional reduction. The feature identifier 120 determines the number of dimensions or features that are to be considered. This number may be provided by a developer or an administrator or may be hard coded into the feature identifier 120. In one illustrative embodiment the number of features that form the K dimensions is between 20 and 40 features. The feature identifier 120 takes the matrix that is built for each file and the corresponding matrix for the machines having that file and multiplies the two matrixes. The process is repeated by the feature identifier 120 for all combinations of the features subject to the constraint of K features. Each resultant matrix of the multiplication of the file matrix and the machine matrix is compared to the original matrix 200 that they were based on. The features in the resultant matrix that most closely matches the original matrix 200 are the features that in one embodiment form the K features that are used. To determine closeness the feature identifier 120 may in some embodiments employ a similarity measure between the resultant matrix and the original matrix.

Comparison engine 130 is a component of the malware detection system 100 configured to compare the vectors for each file that has been created by the feature identifier 120 with known malware. The comparison engine 130 obtains vectors for known malware from the malware database 150. The vectors for the malware are modified such that the vector for each malware only contains the components from the K features of dimension that were determined by the feature identifier 120.

In one embodiment the comparison engine 130 takes a file from the plurality of files 110 and identifies the vector for the file 101 in the file matrix 220. The comparison engine 130 then identifies in both the file matrix 220 and the malware database 150 a predetermined number of files 131 that are the closest or most similar to the file 101. The comparison engine 130 may use any similarity measure to determine that two vectors are similar to the vector for the file 101, such as cosine similarity or Jacard similarity functions. After the predetermined number of files have been determined and obtained the comparison engine 130 identifies the malware files that in the list of files and generates a score for each malware in the list of files. The score for the malware is in one embodiment based off of the distance the vector of the malware is from the vector of the file 101. This distance is a measure of how close the file is to known malware. The distance may be calculated by any known method for calculating distance between vectors in multidimensional space such as Euclidean, inner product, cosine of the angle, etc. This distance is calculated for each malware in the list of files 131. The scores for each malware are then added together to generate a score for the file. This score is representative of how close the file 101 is to known malware. In some embodiments the predetermined number of files 131 are ranked in order of closeness to the file 101 and the ranking is applied as a weighting to the scoring process such that a malware file that was relatively lower in the list of files 131 is not as influential due to the number of non-malware files that were closer to the file 101 than the malware.

In an alternative embodiment the comparison engine 130 proceeds to score all of the files in the list of files 131 as against the vector for the file 101. In this embodiment the scores for all known malware are added to the score for the file 101, while the scores for all files in the list of files that are not malware are subtracted from the score for the file 101. In this approach all close files to the file 101 are considered such that a totality of the environment may be considered.

In some embodiments certain files or vectors may have an additional weight applied to them. For example in instances where a white list of files 155 are maintained in the malware database proximity in terms of distance to a whitelist file 155 may cause the score for a whitelist file to be weighted higher than a non-whitelist file. In other embodiments known malware and known whitelist files may be weighted heavier than unknown files in the list of files 131. In this example a known malware file may be weighted with weight of 1, an unknown file weighted with a weight of 0 and a whitelist file weighted with a weight of −1. If the file has a positive score it may identified as possible malware and a negative score it may be considered a safe file.

In yet another embodiment the comparison engine 130 starts from the known malware in the malware database 150. For each malware item in the malware database 150 the comparison engine 130 identifies a predetermined number of files in the file matrix 220 that are the closest to the malware item. Again any similarity function may be used to identify this list of files 132. The comparison engine 130 then proceeds to score each of the files in the list of files 132 as against the known malware item. This process is repeated for each known malware item in the malware database 150. A score is calculated for each of the files in the file matrix 220 based on the scoring for the file when it was contained in the list of files 132. That is each time the file 101 was in the list of files 132 it received a score as against a known piece of malware. The summation of the scores for the file across all malware is the score for the file 101. If the file 101 did not appear in any list of files 132 then it would not have a score. If the score of the file exceeds a threshold score the file may be tagged as potential malware. This approach can in some embodiments be used against the whitelist items 155, where the score for these matches are negative scores which can be computed against the scores generated from the malware.

The malware classification component 140 takes the scores that are generated by the comparison engine 130 and determines if a particular file has potential for being malware. In some embodiments the malware classification component 140 compares the score of the file to a threshold score. If the file exceeds a threshold score the file is marked as a possible malware candidate. In some embodiments a second threshold score may be present as well. The second threshold score is a score representative of a very strong likelihood that the file is malware. If the file exceeds the second threshold the malware classification component 140 may cause an anti-malware component on the machine to take a particular action such as quarantining the file, blocking its execution, removing the file from the associated machine. Files that fall between the first and second threshold may in some embodiments flagged for a malware researcher to look at in more detail and make a determination that the file is or is not malware. In this way the researcher is able to focus on fewer files as the malware detection system has removed from the list of files for the researcher to look at those files that have a very high likelihood of being malware. In additional embodiments the malware classification component 140 may label files who have a score that falls under a third threshold score, which is lower than the first threshold score, as safe files. In this way the file is determined to be a whitelist file. All of the files marked as either malware or whitelist may be added by the malware classification component 140 to the malware database. This output is illustrated by alert 145 in FIG. 1

Malware database 150 is a database that houses the features of known malware files. In some embodiments, the malware database 150 may also house the actual malware files, or the signatures of the malware files. These files have been processed in a manner similar to the plurality of files 110 such that vectors based on the K dimensions may be created for use by the comparison engine 130 in score files. The difference is that the files in the malware database 150 are known to be malware. As new malware is discovered those files and their corresponding features may be added to the malware database 150. In some embodiments the malware database 150 includes whitelist files 155. Again whitelist files are files that are known to be safe files and are processed and stored in database 150 such that vectors may be obtained for the whitelist files 155.

Figure 3:
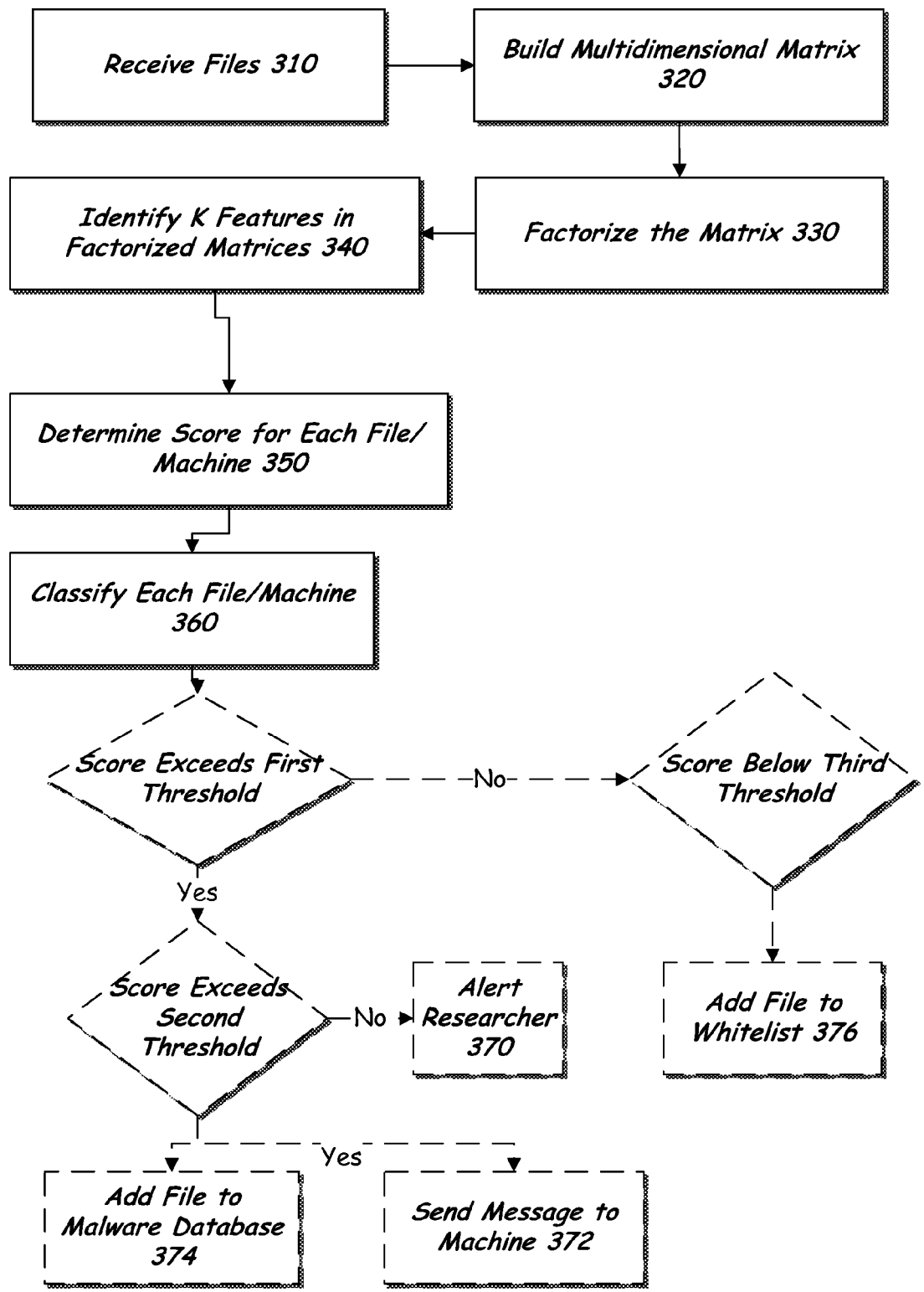
FIG. 3 is a flow diagram illustrating a process for identifying files as potential or actual malware according to one illustrative embodiment.

FIG. 3 is a flow diagram illustrating a process for identifying files as either malware or safe according to one illustrative embodiment of the present disclosure. While this discussion is focused on files, the same process can be applied to each machine or URLs that have been observed to communicate with or serve the files or machines. Process 300 begins with the receipt of a plurality of files 110 from a plurality of machines 112. This is illustrated at step 310. The plurality of files 110 may be all of the files on each of the plurality of machines 112 or may be a subset of files on each of the plurality of machines. The plurality of files 110 may include files such as documents, spreadsheets, audio, video, configuration files, registry files, operating system files or any other component or subcomponent of a computing system that may be susceptible to having a malware infestation.

The plurality of files 110 are then organized into a matrix of files and machines. This matrix 200 is representative of each of the machines in the plurality of machines and each of the files in the plurality of files 110. This matrix 200 allows for the correspondence of a file to multiple machines and conversely a machine to multiple files. Each file and machine has a plurality of features associated with the file/machine. Again, these features can include properties such as behavior, size, date it appeared on a machine, similarity to other files, etc. The building of the multidimensional matrix of machines and files is illustrated at step 320.

At step 330 the system factorizes the matrix 200 to generates two matrices. The first matrix is the machine matrix 210 and the second matrix is the file matrix 220. These matrices are generated as discussed above with respect to FIG. 1.

After the matrix 200 has been factorized into the two matrices 210 and 220 the system then identifies K number of features or dimensions that are most descriptive or informative in describing a file. This is illustrated at step 340. To identify the K number of features that are most descriptive of the files the system multiplies the matrix 210 by matrix 220 over K number of features. The system does this for all permutations of features such that each time there are K number of features. The resultant matrix that is closest to the matrix 200 identifies the specific features that will form the K number of features. The resultant versions of matrix 210 and 220 are formed by removing from these matrices all of the features but for the specific K features.

Next the process continues by determining a score or malware score for each of the files in the plurality of files 110. This is illustrated at step 350. At step 350 the system can employ several different approaches for scoring a file. In one embodiment the system identifies for a specific file, such as file 101, from both a malware database 150 and the plurality of files 110 a predetermined number of files that are most similar to the file 101 as a list of files 131. Next the system calculates a score based on the distance from the vector of the file 101 each file that is in the malware database is across the K features. In another embodiment the system calculates a weighted score for each file in the list of files 131. The weighted list may add a value to the score for known malware, subtract a score for known safe files, such as files in whitelist 150 and zero out scores for files not falling into either category. Additionally the weighted score may be based on a determined ranking of the files 131 based on their similarity measure to the file 101.

In an alternative embodiment at step 350 the system takes each file in the malware database 150 and identifies a predetermined number of files in the plurality of files 110 that are closest to each file in the malware database as a list of files 132. Each time a particular file, such as file 101 appears in the list of files 132 for a malware item the file 101 is scored. After all malware has been compared the file receives its final score. Again the scoring is based off of the distance of the vector of the file from the vector of the malware item. Further in some embodiments the score may be based off of a weighted scoring where closeness to known non-malware items is also considered.

Once the score has been calculated for the files at step 350, the scores are provided to a malware classification component 140. The malware classification component 140 determines if a particular file is malware, might be malware, or is safe. This is illustrated at step 360. The malware classification component 140 may classify a file as potential malware if it exceeds a threshold score. The malware classification component 140 may notify a researcher of the file at step 370 if the first threshold is exceeded. It may classify a file as definitely malware if it exceeds a second higher threshold. If the file exceeds the second threshold the malware classification component 140 may cause the anti-malware program on a particular machine to perform an action with respect to the file by sending a signal to the particular machine. This is illustrated at step 372. The malware classification component 140 may also add the file to the malware database 150 at step 374 automatically without involving the researcher. Conversely, if the score for the file falls below a third threshold that is lower than the first threshold the file may be added to the whitelist at step 376.

In the instances where the machine is looked at as opposed to the file the system 100 takes the vectors of all of the files on the machine and compares those vectors (for the K number of features) and scores the machine as against the known malware. If the score for the machine or the number of file on the machine exceeds a threshold that machine may be considered as under a malware attack. Additionally the system 100 may look at machines that have similar vector profiles as the machine that is under attack and depending on the similarity of the conditions between the two machines may alert an administrator of a potential issue with those machines. Regardless of whether machines or files are considered the basic steps and processes disclosed herein are similar.

Figure 4:
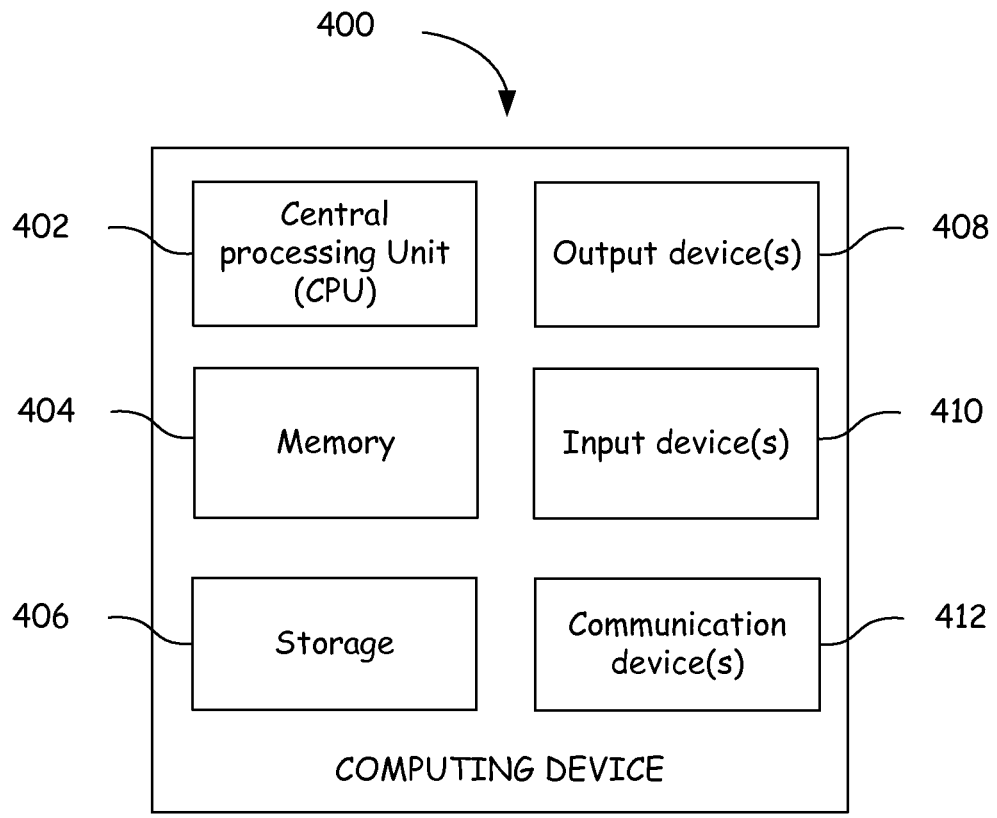
FIG. 4 illustrates a component diagram of a computing device according to one embodiment.

FIG. 4 illustrates a component diagram of a computing device according to one embodiment. The computing device 400 can be utilized to implement one or more computing devices, computer processes, or software modules described herein. In one example, the computing device 400 can be utilized to process calculations, execute instructions, receive and transmit digital signals. In another example, the computing device 400 can be utilized to process calculations, execute instructions, receive and transmit digital signals, receive and transmit search queries, and hypertext, compile computer code, as required by the system of the present embodiments. Further, computing device 400 can be a distributed computing device where components of computing device 400 are located on different computing devices that are connected to each other through network or other forms of connections. Additionally, computing device 400 can be a cloud based computing device.

The computing device 400 can be any general or special purpose computer now known or to become known capable of performing the steps and/or performing the functions described herein, either in software, hardware, firmware, or a combination thereof.

In its most basic configuration, computing device 400 typically includes at least one central processing unit (CPU) 402 and memory 404. Depending on the exact configuration and type of computing device, memory 404 may be volatile (such as RAM), non-volatile (such as ROM, flash memory, etc.) or some combination of the two. Additionally, computing device 400 may also have additional features/functionality. For example, computing device 400 may include multiple CPU's. The described methods may be executed in any manner by any processing unit in computing device 400. For example, the described process may be executed by both multiple CPU's in parallel.

Computing device 400 may also include additional storage (removable and/or non-removable) including, but not limited to, magnetic or optical disks or tape. Such additional storage is illustrated in FIG. 5 by storage 406. Computer storage media includes volatile and nonvolatile, removable and non-removable media implemented in any method or technology for storage of information such as computer readable instructions, data structures, program modules or other data. Memory 404 and storage 406 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 400. Any such computer storage media may be part of computing device 400.

Computing device 400 may also contain communications device(s) 412 that allow the device to communicate with other devices. Communications device(s) 412 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 400 may also have input device(s) 410 such as keyboard, mouse, pen, voice input device, touch input device, etc. Output device(s) 408 such as a display, speakers, printer, etc. may also be included. All these devices are well known in the art and need not be discussed at length. Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A malware detection system comprising:
   at least one processor;
   a feature identifier configured to generate a matrix of files and associated machines having a plurality of features associated with the files and machines, the feature identifier further configured to apply matrix factorization to the matrix of files and associated machines to generate a machine matrix and a file matrix, and is configured to perform dimensional reduction to identify a group of features from the plurality of features that are most informative features, wherein the group of features is a fixed number of features and comprises a subset of the plurality of features;

a malware database comprising files of known malware and a plurality of features associated with the known malware;

a comparison engine configured to identify for a file a number of other files that are similar to the file from the matrix of files and the malware database and to score the file based on a closeness of the other files to the file; and malware classification component configured to identify potential malware based on the score of the file and is further configured to create an alert if the score for the file exceeds a first threshold score.

2. The malware detection system of claim 1 wherein feature identifier is further configured to determine the group of features by comparing a multiplication of the machine matrix and the file matrix limited to the group of features, the multiplication yielding a resultant matrix, and identifying the resultant matrix that most closely corresponds with the matrix of files and associated machines.

3. The malware detection system of claim 2 wherein the feature identifier identifies the group of features by applying all possible permutations of a number of features in the plurality of features that comprises the fixed number of features in the group of features.

4. The malware detection system of claim 2 wherein the comparison engine is further configured to generate a vector for the file based on the group of features and corresponding vectors for the number of other files based on the group of features.

5. The malware detection system of claim 4 wherein the comparison engine is further configured to score the file based on a distance measure of the vector for the file with the corresponding vector for each of the number of files.

6. The malware detection system of claim 4 wherein the comparison engine is further configured to:
identify at least one known malware in the number of other files; and
score the file based on a distance measure of the vector for the file with the corresponding vector for the at least one known malware.

7. The malware detection system of claim 4 wherein the malware database further comprises a whitelist of files known not to be malware and the plurality of features associated with the whitelist of files.

8. The malware detection system of claim 4 wherein the comparison engine is further configured to:
identify at least one known malware in the number of other files;
identify at least one file from the whitelist in the number of other files;
score the file based on a distance measure of the vector for the file with the correspond vector for the at least one known malware and the at least one whitelist file by adding the distance measure for the at least one known malware to the score and subtracting the distance measure for the at least one whitelist item.

9. The malware detection system of claim 1 wherein the malware classification component is further configured to automatically add the file to the malware database when the score for the file exceeds a second threshold score that is greater than the first threshold score.

10. The malware detection system of claim 1 wherein the malware classification component is further configured to generate a signal to a machine associated with the file instructing the machine to take an action relative to the file when the score for the file exceeds a second threshold score that is greater than the first threshold score.

11. A method for identifying unknown malware files from a plurality of files comprising:
receiving a plurality of files from a plurality of machines each file and each machine having a plurality of features each of the plurality of files associated with at least one of the plurality of machines upon which the file resides;
building a multidimensional matrix associating the plurality of files with the plurality of machines;
identifying from the multidimensional matrix a group of features that are most informative in describing a file in the matrix wherein the group of features is a fixed number of features and comprises a subset of the plurality of features for the plurality of files and the plurality of machines;
determining a malware score for at least one file in the plurality of files;
determining if the at least one file is potential malware by comparing the malware score for the at least one file against a threshold malware score; and
generating an alert when the at least one the is determined to be potential malware;
wherein the preceding steps are performed by at least one processor.

12. The method of claim 11 wherein determining the malware score further comprises:
identifying from a malware database and the plurality of files a group of files that are similar to the at least one file;
generating a vector for the at least one file and a plurality of corresponding vectors for each file in the group of files based on the group of features;
determining a distance measure between the vector for the at least one file and each of the plurality of corresponding vectors; and
adding the determined distance measures as the malware score for the at least one file.

13. The method of claim 12 further comprising:
ranking the group of files based on a similarity measure to the at least one file;
weighting each file in the group of files according to the ranking; and
applying the weighting to the determined distance measure for each file.

14. The method of claim 12 wherein the group of files includes at least one file known not to be malware and at least one file known to be malware, wherein adding further comprises:
adding to the malware score the determined distance measures for the at least one file known to be malware;
subtracting from the malware score the determined distance measure for the at least one file known not to be malware; and
not adding to the malware score files that are neither known malware or known not to be malware.

15. The method of claim 11 wherein determining the malware score further comprises:
identifying at least one malware file in a malware database;
for each of the at least one malware file:
identifying a group of files in the plurality of files that are similar to the malware file;
generating a vector for the malware file and a plurality of corresponding vectors for each file in the group of files based on the group of features;
determining a distance measure between the vector for the malware file and each of the plurality of corresponding vectors; and for each file in the plurality of files;
adding the determined distance measure between the malware file and the corresponding file in the group of files as the malware score for that file.

16. The method of claim 14 wherein when the malware score for the at least one file exceeds the threshold score further comprising:
    determining if the malware score exceeds a second threshold score that is greater than the threshold score;
    when the malware score is less than the second threshold score, alerting a researcher that the at least one file is potential malware; and
    when the malware score is not less than the second threshold score, classifying the at least one file as malware; and
    automatically adding the at least one file to a malware database.

17. A computer readable storage device having computer readable instructions that when executed cause at least one computing device to:
    receive a plurality of files from a plurality of machines each file and each machine having a plurality of features;
    build a multidimensional matrix associating the plurality of files with the plurality of machines;
    identify from the multidimensional matrix a group of features that are most informative in describing a machine in the matrix wherein the group of features is a fixed number of features and comprises a subset of the plurality of features;
    determine a vector distance for files on the at least one machine with corresponding vectors for a plurality of known malware files in a malware database wherein the vector and corresponding vectors are based on the group of features;
    determine a malware score for at least one machine in the plurality of machines by adding the determined distance; and
    determine if the at least one machine is compromised by malware by comparing the malware score for the at least one malware against a threshold malware score.

* * * * *